(12) United States Patent
Holdren

(10) Patent No.: US 7,510,218 B2
(45) Date of Patent: Mar. 31, 2009

(54) PIPE/CONNECTOR WELD JOINT, AND METHODS OF WELDING SAME

(75) Inventor: Richard Lyell Holdren, Lancaster, OH (US)

(73) Assignee: Grant Prideco, L.P., Houston, TX (US)

(*) Notice: Subject to any disclaimer, the term of this patent is extended or adjusted under 35 U.S.C. 154(b) by 99 days.

(21) Appl. No.: 10/546,348

(22) PCT Filed: Jul. 20, 2004

(86) PCT No.: PCT/US2004/023329

§ 371 (c)(1),
(2), (4) Date: Apr. 11, 2006

(87) PCT Pub. No.: WO2005/009662

PCT Pub. Date: Feb. 3, 2005

(65) Prior Publication Data

US 2006/0191874 A1 Aug. 31, 2006

Related U.S. Application Data

(60) Provisional application No. 60/488,931, filed on Jul. 21, 2003.

(51) Int. Cl.
*F16L 13/02* (2006.01)
*F16L 25/00* (2006.01)
*F16L 35/00* (2006.01)

(52) U.S. Cl. .............. 285/288.6; 285/288.1; 285/288.5; 285/330

(58) Field of Classification Search .............. 285/288.1, 285/288.6, 333, 334, 288.5, 330; 219/61, 219/73

See application file for complete search history.

(56) References Cited

U.S. PATENT DOCUMENTS

| 1,236,145 | A |   | 8/1917 | Burns |
| 1,810,902 | A |   | 6/1931 | Burnish |
| 3,002,871 | A | * | 10/1961 | Schaub et al. ............... 156/73.2 |
| 3,268,248 | A | * | 8/1966 | Leslie ..................... 285/288.6 |
| 3,727,025 | A |   | 4/1973 | Dibenedetto ................. 219/73 |
| 3,986,735 | A |   | 10/1976 | Zondag ....................... 285/286 |

FOREIGN PATENT DOCUMENTS

| JP | 7-314174 | 12/1995 |
| JP | H7-314174 | 12/1995 |
| JP | 10-277744 | 10/1998 |
| JP | H10-277744 | 10/1998 |
| JP | 11-342493 | 12/1999 |
| JP | H11-342493 | 12/1999 |

* cited by examiner

*Primary Examiner*—Kevin P Kerns
*Assistant Examiner*—Megha Mehta
(74) *Attorney, Agent, or Firm*—Jeffrey E. Daly; Williams, Morgan & Amerson

(57) ABSTRACT

The present invention is directed to a pipe section (220) and a connector (400) that are adapted to be welded together, wherein each of the pipe and connector have inner and outer beveled surfaces and the joint is comprised of an angular alignment land (60). In one embodiment, an outer beveled surface on the pipe and an inner beveled surface on the connector cooperate to define the angular alignment land (60). In yet another illustrative embodiment, the inner beveled surface of the connector and the outer beveled surface of the pipe have a bevel angle of approximately 30 degrees, while the outer beveled surface of the connector and the inner beveled surface of the pipe have a beveled angle of approximately 45 degrees.

25 Claims, 4 Drawing Sheets

PIPE/CONNECTOR WELD JOINT, AND METHODS OF WELDING SAME

The present application is a United States nationalization of PCT International Patent Application PCT/US2004/023329, filed Jul. 20, 2004, which claims priority to U.S. Provisional Application Ser. No. 60/488,931, filed Jul 21, 2003, the entire contents of which are specifically incorporated herein by reference in their entirety.

TECHNICAL FIELD

The present invention is generally directed to the field of tubular structures, and, more particularly, to a novel joint design between a tubular component and a connector and a method of welding same.

BACKGROUND ART

In the oilfield industry, many separate lengths of pipe are coupled together to create, in some cases, very long conduit structures. Such structures may be used for a variety of purposes, e.g., transportation of oil and gas, lining of wells, etc. Typically, each section of pipe is provided with a threaded pin connector (male connector) on one end and a threaded box connector (female connector) on the other end. Pipe sections are coupled to one another by threadingly engaging the pin connector on one tubular with a box connector on another tubular. This process is continued until the desired length of the structure is completed.

In some cases, a section of pipe is provided and the pin and box connectors are welded onto the opposite ends of the pipe. The diameter of the pipe may vary depending on the particular application, e.g., 20", 26", 30", etc. The wall thickness of the pipe may also vary depending upon the particular application, i.e., the wall thickness may vary between approximately 0.438-2.0 inches.

As indicated in FIG. 1, in some cases, the joint 10 between the pipe 12 and the connector 14 was a single bevel joint in which the standard pipe joint bevel of approximately 30 degrees was provided on both components. The longitudinal centerline 13 of the pipe 12 is schematically depicted in FIG. 1 as are exterior surfaces 18 and interior surfaces 20 of the pipe 12 and connector 14. Also depicted in FIG. 1 is a vertical land 15 formed on both the pipe 12 and the connector 14. Typically, the joint 10 was filled by performing one or more welding passes from the outside of the joint 10.

Joining the pipe 12 and connector 14 using the joint 10 configuration depicted in FIG. 1 presented several problems. For example, especially with large diameter piping, obtaining axial alignment between the pipe 12 and the connector 14 was a very difficult and time-consuming process due to a variety of reasons, e.g., the pipe and/or connector being out-of-round, the weight and stiffness of the pipe 12 and connector 14, waviness in the pipe 12, etc. Typically, prior art techniques for axially aligning the pipe 12 and connector 14 might involve welding on various clips and manipulating the pipe 12 and/or connector 14 until such time as the proper axial alignment was achieved. Such manipulation of the components was very difficult due to, among other things, the physical size and weight of the pipe 12 and the connector 14. Thereafter, prior art welding processes often involved tack welding the joint 10 at several locations around the perimeter of the joint 10, followed by performing a MIG welding process to lay down a relatively small weld bead in the joint 10 at the root 19. Thereafter, the joint 10 was completed by performing any of a variety of known welding processes to completely fill the joint 10. Due to the volume of the joint 10, it typically took several passes, i.e., multiple weld beads, to completely fill the joint 10.

The present invention is directed to a device and various methods that may solve, or at least reduce, some or all of the aforementioned problems.

DISCLOSURE OF INVENTION

In one illustrative embodiment, the present invention is directed to a pipe section and a connector that are adapted to be welded together, wherein each of the pipe and connector have inner and outer beveled surfaces and the joint is comprised of an angular alignment land. In one embodiment, an outer beveled surface on the pipe and an inner beveled surface on the connector cooperate to define the angular alignment land. In yet another illustrative embodiment, the inner beveled surface of the connector and the outer beveled surface of the pipe have a bevel angle of approximately 30 degrees, while the outer beveled surface of the connector and the inner beveled surface of the pipe have a beveled angle of approximately 45 degrees.

In another illustrative embodiment, the present invention is directed to a method of welding a pipe and a connector together, wherein the joint may be completely welded by performing a single weld pass on the interior of the weld joint and by performing a single weld pass on the exterior of the joint. In some cases, e.g., for pipe having a wall thickness in excess of one inch, the outer portion of the weld joint may be filled by performing multiple welding passes. In another illustrative embodiment, the present invention is directed to a product that is formed by performing the welding method described above to join a pipe end to a connector.

BRIEF DESCRIPTION OF DRAWINGS

The invention may be understood by reference to the following description taken in conjunction with the accompanying drawings, in which like reference numerals identify like elements, and in which.

Figure 1:
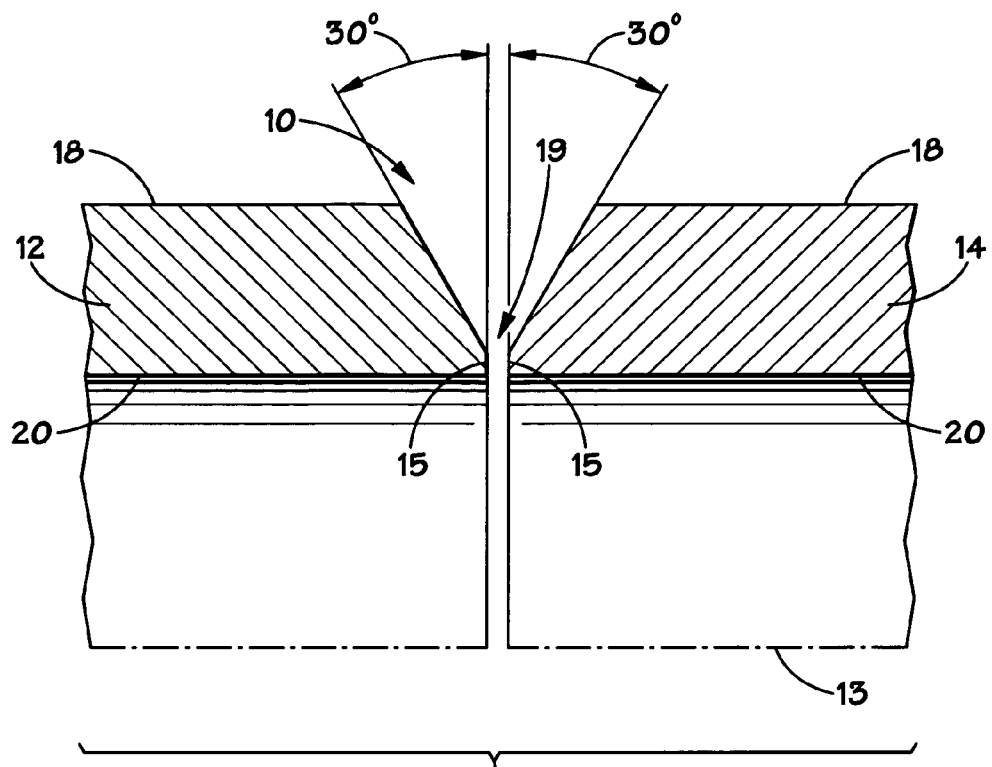
FIG. 1 is a cross-sectional depiction of an illustrative prior art weld joint between a pipe and a connector.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

BEST MODE FOR CARRYING OUT THE INVENTION

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached drawings which are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
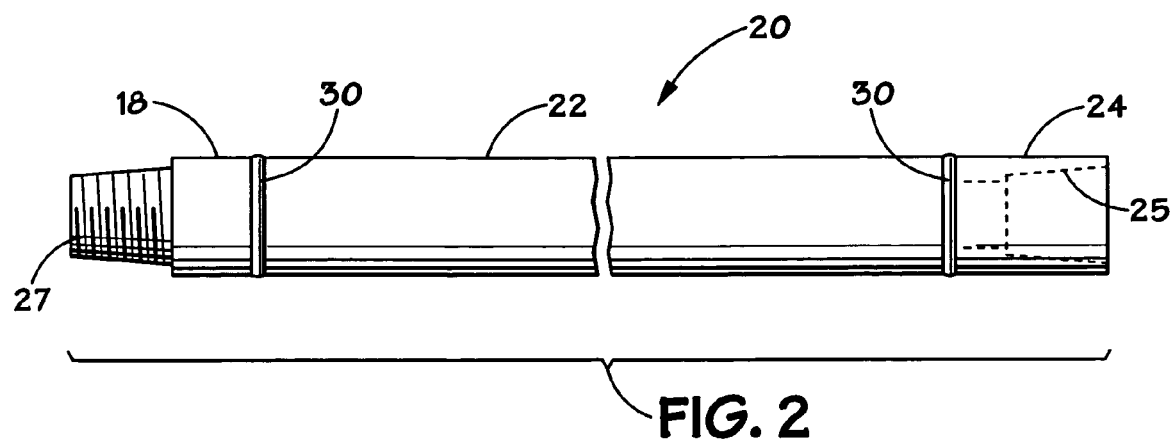
FIG. 2 is a schematic view of an illustrative tubular component having connectors attached thereto in accordance with one illustrative embodiment of the present invention.

As indicated in the background section of the application, tubular components 22 are provided with connectors, such that they may be coupled to other tubular components. FIG. 2 depicts an illustrative pipe section 20 comprised of a length of pipe 22, a female connector 24 having an internally threaded box connection 25 and a male connector having an externally threaded pin connection 27. The connectors 24 and 27 are coupled to the pipe 22 using weld joints 30 in accordance with the present invention. Pipe sections 20 may be coupled to one another via engagement of the threaded connections on adjacent pipe sections 20.

As will be understood by those skilled in the art after a complete reading of the present application, the present invention is not limited to use with any particular type of tubular components or with any particular type of connector 24, 26. For example, the present invention may be employed using API line pipe governed by API Specification 5L (Forty-second edition, January 2000) which is hereby incorporated by reference in its entirety. The connectors 24, 26 may employ any type or size of threads. Thus, the illustrative examples depicted herein should not be considered a limitation of the present invention unless such limitations are expressly recited in the appended claims.

Figure 3A:
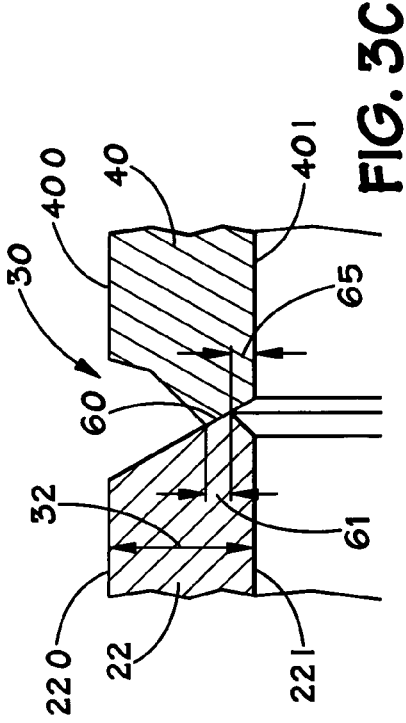
FIGS. 3A-3D are cross-sectional views depicting various details of a weld joint between a pipe and a connector in accordance with one illustrative embodiment of the present invention.
Figure 3B:
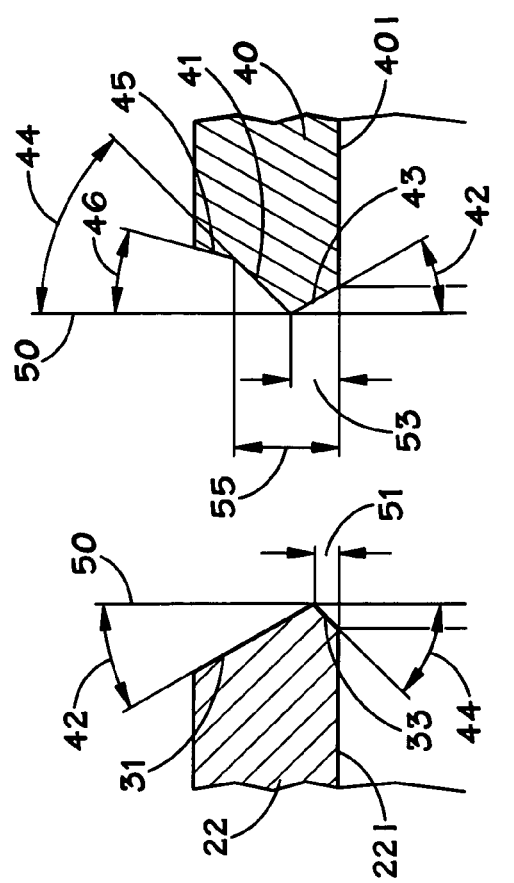
Figure 3C:
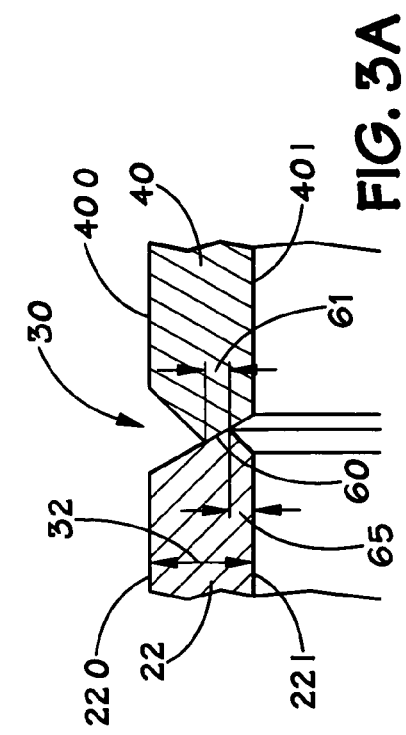
Figure 3D:
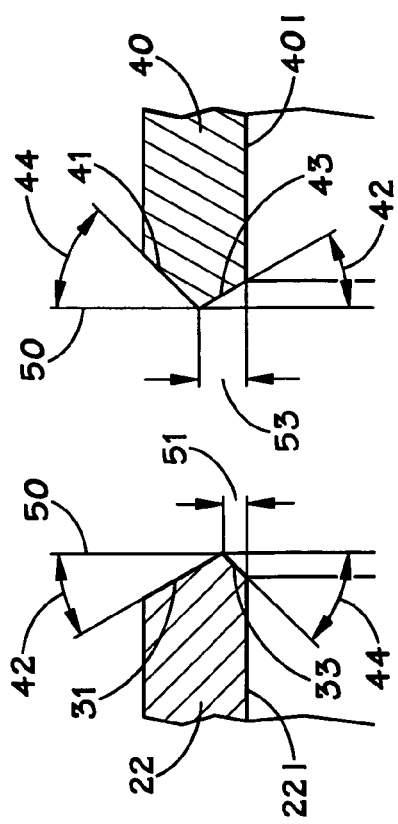

Details and associated geometry of the weld joints 30 in accordance with illustrative embodiments of the present invention will now be described with reference to FIGS. 3A-3B wherein an illustrative pipe 22 is adapted to be welded to a generic connector 40, which may be threaded or not. In FIGS. 3A-3B, a longitudinal axis or centerline 75 of the pipe 22 is depicted. In the lower portions of FIGS. 3A-3B, the pipe 22 and the connector 40 are depicted in an axially spaced-apart relationship, whereas in the upper portions of FIGS. 3A-3B, the pipe 22 and the connector 40 are depicted in an illustrative engaged position. As set forth above, the pipe 22 should be understood to be any type of pipe and the connector 40 should be understood to be any type of connector. In general, the details of the weld joint 30, i.e., geometry and dimensions, may vary depending upon the wall thickness 32 of the pipe 22. The pipe 22 has an inner surface 22I and an outer surface 22O. Similarly, the connector 40 has an inner surface 40I and an outer surface 40O. In the illustrative embodiment, the pipe 22 has an outer beveled surface 31 and an inner beveled surface 33. The connector 40 has an outer beveled surface 41 and an inner beveled surface 43. In joints 30 wherein the wall thickness 32 is greater than 1.375 inches, the connector 40 may have a secondary outer beveled surface 45 (see FIG. 3D).

In the illustrative embodiments depicted in FIGS. 3A-3D, the pipe outer beveled surface 31 and connector inner beveled surface 43 are beveled at an angle 42 of approximately 30 degrees±5 degrees with respect to a line 50 normal to the longitudinal centerline 75 of the pipe 22. However, the included angular misalignment of the mating surfaces 31, 43 should generally be small enough after mating to prevent blowthrough, typically less than approximately 2 degrees. Therefore, in a preferred embodiment, the angle 42 is approximately 30 degrees±1 degree. The pipe inner beveled surface 33 and connector outer beveled surface 41 are beveled at an angle 44 of approximately 45 degrees±5 degrees with respect to the line 50. In the depicted embodiment, the surfaces 31 and 43 have the same bevel angle and the surfaces 33 and 41 have the same bevel angle although that is not required in all embodiments of the present invention. For the embodiments where the wall thickness 32 is greater than 1.375 inches, the secondary outer beveled surface 45 is beveled at an angle 46 of approximately 15 degrees±5 degrees with respect to a normal line 50. The secondary outer beveled surface 45 is provided to, among other things, reduce the volume of the weld joint 30. As such, the secondary outer beveled surface 45 may not be required in all embodiments of the present invention.

In the illustrative embodiments depicted in FIGS. 3A-3D, the pipe inner beveled surface 33 has a radial dimension 51 approximately 0.25 inches, and the connector inner beveled surface 43 has a radial dimension 53 of approximately 0.50 inches. If employed, the secondary outer beveled surface 45 may begin at a radial dimension 55 of approximately 1.25 inches from the inner surface 40I of the connector 40. Of course, these dimensions may vary depending upon the particular application.

As depicted in FIGS. 3A-3D, in one illustrative embodiment, the weld joint 30 of the present invention has an angular alignment land 60 with an illustrative radial thickness 61 of approximately 0.25 inches. The radial thickness 61 of the angular alignment surface 60 may vary from approximately 0.25-0.375 inches depending upon the particular application. That is, the angular alignment land 60 is positioned at an angle, relative to the line 50, that may vary from, for example, approximately 25-50 degrees on either side of the line 50. In general, as the angle 42 gets larger (relative to the line 50) the self-alignment capabilities of the joint 30 tend to increase, but at some point the ability to achieve complete weld penetration of the joint 30 becomes more difficult also. Thus, these competing concerns must be addressed for each particular application.

In one illustrative embodiment, for pipes 22 having a wall thickness 32 of 0.75 inches or greater, the joint 30 is configured such that the angular alignment land 60 begins at a radial location 65 that is approximately 0.25 inches from the inner surface 22I of the pipe 22. However, depending on the particular application, the radial location 65 may vary. For example, for pipes 22 having a wall thickness 32 of approximately 0.50 inches, the radial location 65 may be approximately 0.125 inches from the inner surface 22I of the pipe 22.

For pipes 22 having a wall thickness 32 less than one inch, the angular alignment land 60 is also provided, and it may also have a radial thickness 61 of approximately 0.25 inches. For such relatively thin-walled pipe 22, the angular alignment surface 60 may be positioned at approximately mid-thickness of the pipe 22. For example, for a pipe thickness 32 of 0.500 inches, the radial dimension 51 (see FIG. 3A) of the pipe inner beveled surface 33 may be 0.125 inches, thereby leaving an additional 0.25 inches of thickness beyond the height 61 of the angular alignment land 60. (0.125" internal bevel height+ 0.25 inches angular alignment land thickness+0.125" outer bevel height=0.50" total pipe well thickness). The precise values would, of course, vary depending upon the particular application. However, it is envisioned that in at least some embodiments the angular alignment land 60 would usually have a radial thickness 61 ranging from approximately 0.25- 0.375 inches. It should also be understood that in relatively thin-walled pipes 22, the position of the angular alignment land 60 within the wall of the pipe may vary, i.e., it need not be positioned at the mid-thickness of the pipe 22 in all situations.

The angular alignment land 60 provides many benefits with respect to the alignment of the pipe 22 and the connector 40. For example, in the depicted embodiment, due to the interaction of the pipe outer beveled surface 31 and the connector inner beveled surface 43 of the connector 40, the pipe 22 and connector 40 tend to self-align themselves (in an axial direction) when they are axially urged together with sufficient force. Such force may be applied by a variety of techniques.

Once the weld joint 30 is properly aligned, both axially and circumferentially, the joint 30 may be welded using a variety of known techniques, such as, for example, submerged arc welding (SAW), gas metal arc welding (GMAW) or SAW in combination with GMAW techniques. The joint 30 may be welded using the practices and procedures described in API's specification entitled "Welding Connectors to Pipe" (API Recommended Practice 5C6, First Edition, December 1996), which is hereby incorporated by reference in its entirety.

For pipes 22 having a wall thickness 32 less than or equal to one inch, the design of the joint 30 is such that it may be welded together using a welding process wherein a single pass is made on the inside of the joint 30 and, thereafter, a single pass is made from the outside of the joint 30. That is, such joints 30 may, in some embodiments of the present invention, be completed by performing only two welding passes, one from the inside, one from the outside. For pipes 22 having a wall thickness 32 greater than one inch, the inner portion of the joint 30 may be filled with a single weld pass, like that described above. However, the outer portion of the weld joint 30 may require multiple welding passes to completely fill the outer portion of the joint 30 due to its increased volume.

Figure 4A:
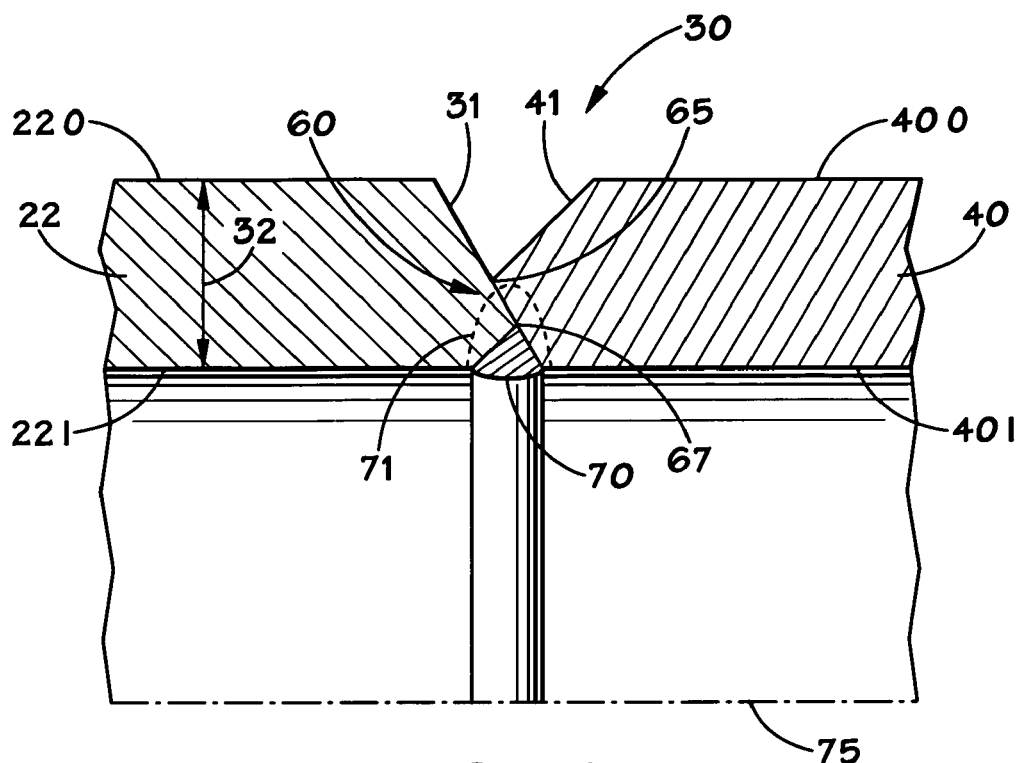
FIGS. 4A-4C depict illustrative embodiments of a welding process that may be employed in accordance with the present invention to fill various illustrative weld joints.

One illustrative welding process that may be employed to weld the joint 30 will be described with more detail with reference to FIGS. 4A and 4B. FIG. 4A depicts an illustrative joint 30 wherein the thickness 32 of the pipe 22 is less than or equal to one inch. The intersection between the outer beveled surface 41 of the connector 40 and the outer beveled surface 31 of the pipe 22 defines an outer root 65 of the joint 30. The intersection of the inner beveled surface 33 of the pipe 22 and the inner beveled surface 43 of the connector 40 defines an inner root 67 of the joint 30.

As indicated previously, in one illustrative embodiment of the present invention, a single inner weld bead 70 may be used to fill the inner portion of the joint 30 using a SAW process. The longitudinal axis of the pipe 22 is indicated by the line 75. The bead 70 may be formed by welding approximately 370 degrees around the interior of the joint 30. The additional 10 degrees of circumferential weld is provided to stitch or overlap the start point of the weld bead 70. The amperage employed to produce the weld bead 70 may be reduced in the area of overlap so as not to result in a localized spot of excessive reinforcement. The initial weld bead 70 should be formed using a process that provides sufficient energy such that the penetration of the weld bead 70, as indicated by dashed line 71, approaches, but does not burn through, the outer root 65 of the joint 30 to the point where the resulting weld joint 30 is defective. In some cases, the weld bead 70 will be formed such that the penetration of the weld bead 70 approaches 50% of the wall thickness 32 of the pipe 22.

Figure 4B:
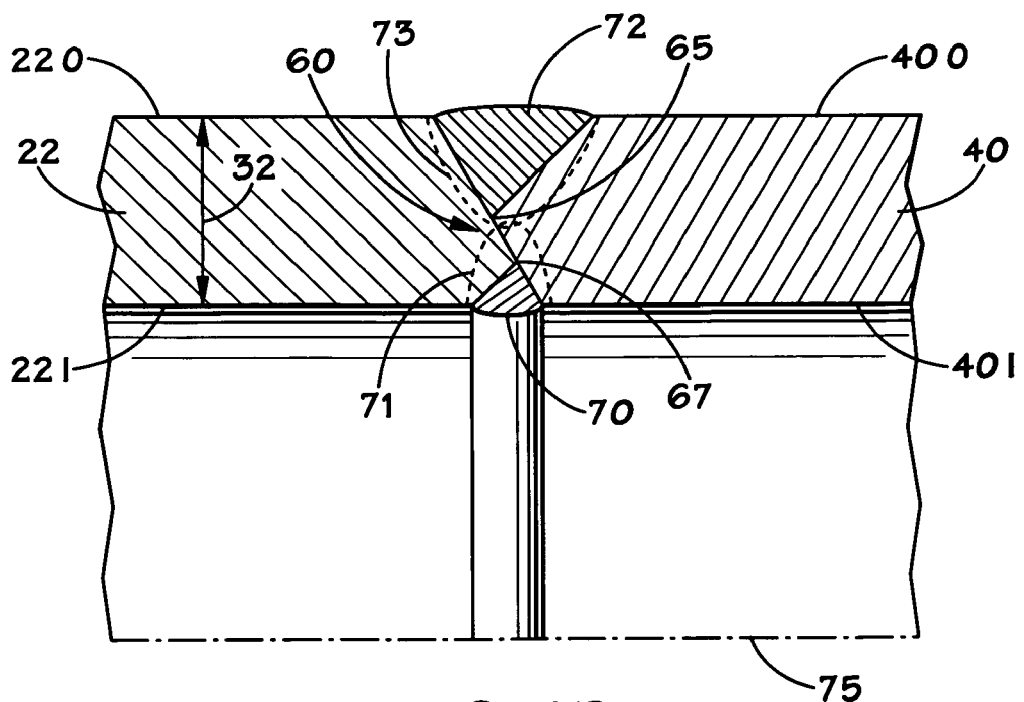

The next process of this illustrative embodiment of the present invention involves forming an outer weld bead 72 in the outer portion of the joint 30 as depicted in FIG. 4B. The weld bead 72 may be formed using a welding process, for example, a SAW process, in a single pass that is performed approximately 370 degrees around the exterior circumference of the joint 30. The penetration of the illustrative weld bead 72 is schematically depicted by the dashed line 73. Due to the presence of the weld bead 70, the process used to form the weld bead 72 may be performed at a relatively high energy level to insure full penetration of the completed joint 30.

In one illustrative embodiment, the joint 30 may be completed using the following illustrative SAW welding procedures. The illustrative welding procedures are described for a joint 30 between a pipe 22 (API 5L X56) having a diameter of 20 inches and a wall thickness of 0.812 inches, and a connector 40 (ASTM A694 F70). The joint 30 is provided with an angular alignment land 60 with a radial thickness 61 of approximately 0.25 inches and the beveled angles 42, 44 (see FIGS. 3A-3D) are approximately 30 and 45 degrees, respectively. In this particularly illustrative example, the joint 30 may be completed by performing a single SAW weld pass on the interior of the joint 30 and by performing a single SAW weld pass on the exterior of the joint 30. The SAW process performed to fill the interior of the joint 30 may be performed at approximately 480-510 amps, approximately 36-38 volts and at a travel speed of approximately 14-15 inches per minute. In one very particular embodiment, the first pass may be performed on the interior of the joint 30 at approximate 480 amps, approximately 37 volts and at a travel speed of approximately 14 inches per minute. The SAW process performed to fill the exterior portion of the joint 30 may be performed at approximately 675-700 amps, approximately 36-39 volts, and at a travel speed ranging from approximately 16.5-17.5 inches per minute. In one very particular embodiment, the SAW process to fill the exterior portion of the joint 30 may be performed at approximately 675 amps, approximately 37 volts and at a travel speed of approximately 16.5 inches per minute. The welding is performed in the flat (horizontal) position while the work pieces are rotated. No preheat or post weld heat treatment was performed in this particular application, although such heat treating process may be required in other applications. The weld interpass temperature is approximately 450 F. In one particular embodiment, the joint 30 may be welded using $3/32$ inch diameter Lincoln L-56 wire with 880M flux wherein the typical electrode stick out is approximately 1.125 inches. In performing the SAW process to fill the exterior portion of the joint 30, the electrode may be offset from the centerline of the joint 30 by approximately 1 inch. However, it should be understood that the above details regarding the SAW welding procedures are illustrative in nature. Thus, the present invention should not be limited to such details unless they are specifically set forth in the appended claims.

Although a process has been disclosed wherein the joint 30 depicted in FIG. 4A may be completed by performing single weld passes from both the inside and outside of the joint 30, the present invention is not limited to such a process. That is, the novel configuration of the joint 30, as defined by the detailed geometry of the pipe surfaces 31, 33 and connector surfaces 41, 43, may be welded together using other welding processes and techniques. For example, the inner portion of the joint 30 may be filled with two or more weld beads instead of the single weld bead 70 depicted in FIG. 4A.

Figure 4C:
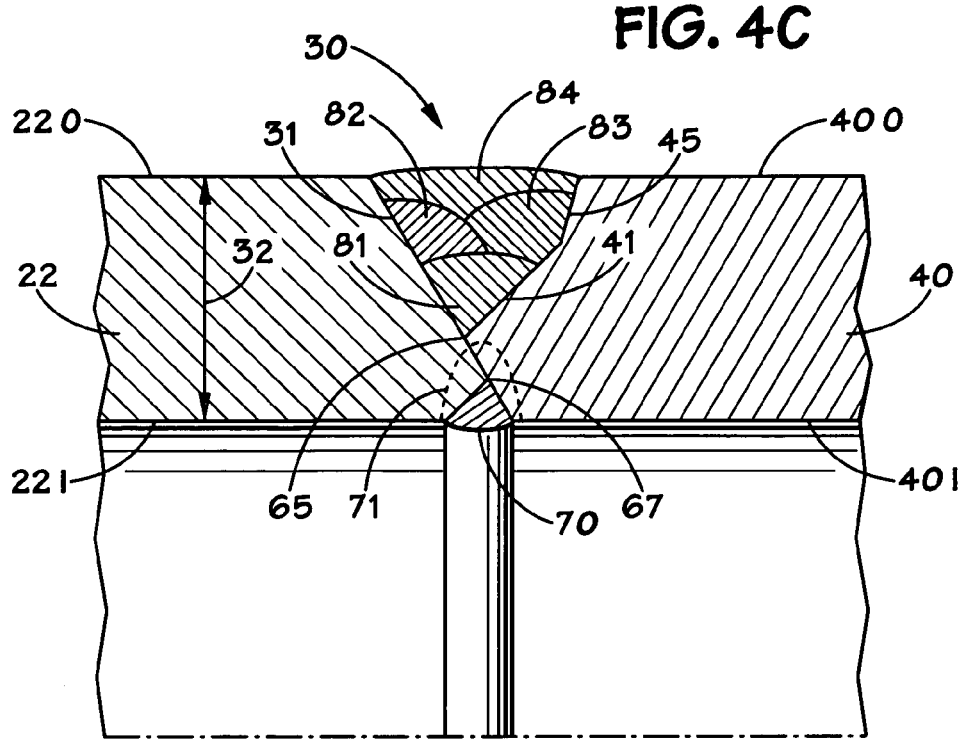

FIG. 4C depicts an illustrative joint 30 wherein the thickness 32 of the pipe 22 is greater than one inch. In one illustrative embodiment, the inner portion of the joint 30 depicted in FIG. 4C may be filled with a single weld bead 70 using a welding process as described above with reference to FIG. 4A. Due to its relatively large volume, the outer portion of the joint 30 in FIG. 4C may be filled with multiple weld beads by performing multiple welding passes or using multiple welding tools. For example, the outer portion of the joint 30 may be filled using four weld beads 81, 82, 83 and 84 that are sequentially deposited using any of a variety of welding techniques. During the formation of the first weld bead 81, the energy of the welding process may be increased to insure complete penetration of the joint 30. In fact, the first weld bead 81 may be applied at a relatively high energy due to the presence of the previously formed weld bead 70 on the inner portion of the joint 30.

Figure 5A:
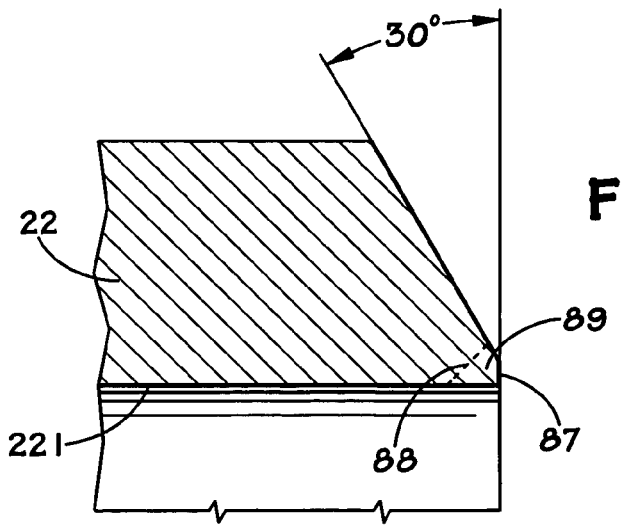
FIGS. 5A-5B depict one illustrative technique for forming the inner beveled surface of the pipe in accordance with one aspect of the present invention.
Figure 5B:
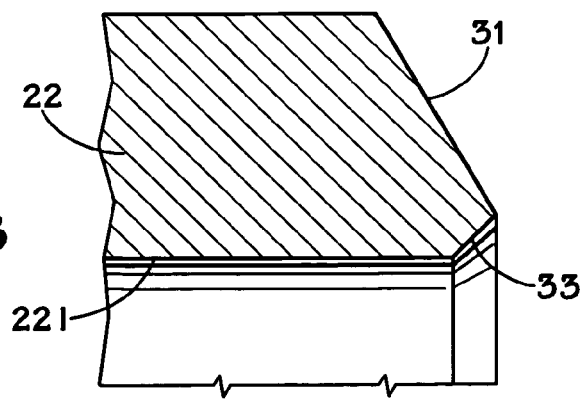

The various beveled surfaces 31, 33, 41, 43 on pipe 22 and connector 40 may be formed by a variety of techniques, e.g., machining, cutting, grinding, arc gouging, torch cutting, etc. The surface finish on the various beveled surfaces, e.g., 31, 33, 41, 43 may be approximately 250 RMS. In one particular embodiment, as indicated in FIG. 5A, the pipe 22 may be purchased with an industry standard 30° bevel and vertical land 87. Thereafter, the inner beveled surface 33 (indicated in dashed lines 88 in FIG. 5A) may be formed by removing the vertical land 87 and the adjacent material 89 as indicated in FIGS. 5A-5B. That is, an internal chamfer may be formed on standard API pipe to define the inner beveled surface 33. As set forth above, any technique may be employed to remove the land 87 and the adjacent material 89 to thereby define the inner beveled surface 33. Moreover, it will be understood by those skilled in the art after reading the present application that the beveled surfaces formed on the pipe 22 and connector 40 could, if desired, be reversed. That is, the beveled surfaces 41, 43 formed on the connector 40 could be formed on the pipe 22, and the beveled surfaces 31, 33 formed on the pipe 22 could be formed on the connector 40. Moreover, the present invention may also be employed in situations when the joint 30 is inverted, i.e., the beginning radial location of the angular alignment land 60 may be positioned approximately 0.25-0.375 inches from the outer surface 22O of the pipe 22. Thus, the present invention should not be considered as limited to the illustrative embodiments and configurations depicted herein unless such limitations are expressly recited in the pending claims.

The present invention is generally directed to a novel weld joint that may be used to join tubular components, such as, for example, a connector and a pipe and to various novel methods of welding such components together. In one illustrative embodiment, the present invention is directed to a device comprised of a pipe and a connector adapted to be welded to the pipe at a weld joint, wherein the pipe and the connector each have an inner beveled surface and an outer beveled surface, and wherein the weld joint has an angular alignment land. In another illustrative embodiment, the present invention is directed to a method comprised of positioning a connector adjacent an end of a pipe to which it is adapted to be welded at a weld joint, wherein the pipe and the connector each have an inner beveled surface and an outer beveled surface, and wherein the weld joint has an angular alignment land, and performing at least one welding process to weld the connector to the pipe at the weld joint. In another illustrative embodiment, the present invention is directed to a method wherein the weld joint is completed by performing at least one welding pass to fill an interior portion of the weld joint, and performing at least one welding pass to fill an exterior portion of the weld joint. In yet another illustrative embodiment, the present invention is directed to a method wherein the welding is accomplished by performing a first single welding pass to fill an interior portion of the weld joint, and performing a second single welding pass to fill an exterior portion of the weld joint. In yet a further embodiment, the present invention is directed to a method comprised of performing a first single welding pass to fill an interior portion of the weld joint, and performing a plurality of welding passes to fill an exterior portion of the weld joint.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A device, comprising:
   a pipe; and
   a connector adapted to be welded to said pipe at a weld joint, wherein said pipe and said connector each have only one inner beveled surface and only one outer beveled surface, and wherein the inner and outer beveled surfaces of the pipe and the connector are adapted to be contacting along only a single tapered mating surface to form only a single angular self-alignment land on said weld joint along the single tapered mating surface.

2. The device of claim 1, wherein said connector is comprised of an internally threaded box.

3. The device of claim 1, wherein said connector is comprised of an externally threaded pin.

4. The device of claim 1, wherein said angular self-alignment land has a radial thickness ranging from 0.25-0.375 inches.

5. The device of claim 1, wherein said angular self-alignment land begins at a point that is radially offset 0.125-0.25 inches from an internal cylindrical surface of said pipe.

6. The device of claim 1, wherein said angular self-alignment land begins at a point that is radially offset 0.125-0.25 inches from an external cylindrical surface of said pipe.

7. The device of claim 1, wherein said angular self-alignment land is formed at an angle ranging from 25 to 50 degrees on either side of a line normal to a longitudinal centerline of said pipe.

8. The device of claim 1, wherein said angular self-alignment land is defined by an engagement between said outer beveled surface of said pipe and said inner beveled surface of said connector.

9. The device of claim 1, wherein said angular self-alignment land is defined by an engagement between said outer beveled surface of said connector and said inner beveled surface of said pipe.

10. The device of claim 1, wherein said inner beveled surface of said pipe and said outer beveled surface of said connector have similar first bevel angles and said outer beveled surface of said pipe and said inner beveled surface of said connector have similar second bevel angles, wherein the first and second bevel angles are different from one another.

11. The device of claim 10, wherein said first bevel angle is 45±5 degrees and said second bevel angle is 30±5 degrees.

12. A device, comprising:
    a pipe; and
        a connector welded to said pipe at a weld joint, wherein, prior to being welded together, said pipe and said connector each have only one inner beveled surface and only one outer beveled surface, and wherein the inner and outer beveled surfaces of the pipe and the connector are adapted to be joined with each other along only a single tapered mating surface to form an angular self-alignment land on said weld joint at the tapered mating surface.

13. The device of claim 12, wherein said connector is comprised of an internally threaded box.

14. The device of claim 12, wherein said connector is comprised of an externally threaded pin.

15. The device of claim 12, wherein said angular self-alignment land has a radial thickness ranging from 0.25-0.375 inches.

16. The device of claim 15, wherein said angular self-alignment land begins at a point that is radially offset 0.125-0.25 inches from an internal cylindrical surface of said pipe.

17. The device of claim 12, wherein said angular self-alignment land is formed at an angle ranging from 25-50 degrees on either side of a line normal to a longitudinal centerline of said pipe.

18. The device of claim 17, wherein said angular self-alignment land is defined by an engagement between said outer beveled surface of said pipe and said inner beveled surface of said connector.

19. The device of claim 12, wherein said inner beveled surface of said pipe and said outer beveled surface of said connector have similar first bevel angles and said outer beveled surface of said pipe and said inner beveled surface of said connector have similar second bevel angles, wherein the first and second bevel angles are different from one another.

20. The device of claim 19, wherein said first bevel angle is 45 degrees ±5 degrees and said second bevel angle is 30 degrees ±5 degrees.

21. A device, comprising:
    a pipe; and
        a connector welded to said pipe at a weld joint, wherein, prior to being welded together, said pipe and said connector each have only one inner beveled surface and only one outer beveled surface, beveled surfaces of the pipe and the connector join to form a single angular self-alignment land on said weld joint along a single tapered mating surface;
        wherein said inner beveled surface of said pipe and said outer beveled surface of said connector each have bevel angles within two degrees of each other and each in a range from 25 degrees to 35 degrees,
        and said outer beveled surface of said pipe and said inner beveled surface of said connector have bevel angles within two degrees of each other and each in a range from 40 degrees to 50 degrees.

22. The device of claim 21, wherein said angular self-alignment land has a radial thickness ranging from 0.25-0.375 inches.

23. The device of claim 22, wherein said angular self-alignment land begins at a point that is radially offset 0.125-0.25 inches from an internal cylindrical surface of said pipe.

24. The device of claim 22, wherein said angular self-alignment land begins at a point that is radially offset 0.125-0.25 inches from an external cylindrical surface of said pipe.

25. The device of claim 24, wherein said angular self-alignment land is formed at an angle ranging from 25-50 degrees on either side of a line normal to a longitudinal centerline of said pipe.

* * * * *